US007707090B2

(12) United States Patent
Snyder

(10) Patent No.: US 7,707,090 B2
(45) Date of Patent: *Apr. 27, 2010

(54) METHOD AND SYSTEM FOR SELECTING OPTIMAL COMMODITIES BASED UPON BUSINESS PROFILE AND PREFERENCES

(75) Inventor: Scott Andrew Snyder, Berwyn, PA (US)

(73) Assignee: Globys, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/195,752

(22) Filed: Aug. 21, 2008

(65) Prior Publication Data

US 2009/0030796 A1 Jan. 29, 2009

Related U.S. Application Data

(63) Continuation of application No. 09/580,448, filed on May 30, 2000, now Pat. No. 7,430,531, which is a continuation-in-part of application No. 09/497,483, filed on Feb. 4, 2000, now abandoned.

(51) Int. Cl.
*G06Q 40/00* (2006.01)
(52) U.S. Cl. .................. 705/35; 705/36 R; 705/37; 705/1; 705/26
(58) Field of Classification Search .......... 705/35–37, 705/1, 26
See application file for complete search history.

(56) References Cited

U.S. PATENT DOCUMENTS 4,829,426 A 5/1989 Burt

| 5,182,793 | A |   | 1/1993  | Alexander et al. |
|-----------|---|---|---------|------------------|
| 5,483,445 | A |   | 1/1996  | Pickering        |
| 5,521,364 | A | * | 5/1996  | Kimura et al. ............. 235/383 |
| 5,537,314 | A |   | 7/1996  | Kanter           |
| 5,583,763 | A |   | 12/1996 | Atcheson et al.  |

(Continued)

FOREIGN PATENT DOCUMENTS

EP     1197433 A1 *  4/2002

(Continued)

OTHER PUBLICATIONS

Official Communication for U.S. Appl. No. 09/580,448, mailed on Aug. 5, 2002.

(Continued)

*Primary Examiner*—Narayanswamy Subramanian
(74) *Attorney, Agent, or Firm*—Darby & Darby P.C.; Jamie L. Wiegand

(57) ABSTRACT

A system and method for assisting a customer in choosing a combination of commodities based on preferences of the customer. A combination is a set of related commodities, wherein bundling discounts may be applied to particular bundles of related commodities. Combination options are created by optimizing the categories within the combination in parallel, and then selecting the best value options from each category into a grouping. The effective cost of a grouping is calculated as a total of the effective costs of each option within the grouping. The effective costs consider weighted values of performance features in addition to the actual cost of a commodity. The groupings are ranked and presented to the user, so that the user may select a grouping as combination of commodities for purchase.

20 Claims, 11 Drawing Sheets

U.S. PATENT DOCUMENTS

| | | | |
|---|---|---|---|
| 5,655,085 A | 8/1997 | Ryan et al. | |
| 5,684,963 A | 11/1997 | Clement | |
| 5,684,965 A | 11/1997 | Pickering | |
| 5,765,144 A | 6/1998 | Larche et al. | |
| 5,768,142 A * | 6/1998 | Jacobs | 700/231 |
| 5,794,207 A | 8/1998 | Walker et al. | |
| 5,802,502 A | 9/1998 | Gell et al. | |
| 5,862,203 A | 1/1999 | Wulkan et al. | |
| 5,873,071 A | 2/1999 | Ferstenberg et al. | |
| 5,873,072 A | 2/1999 | Kight et al. | |
| 5,897,621 A | 4/1999 | Boesch et al. | |
| 5,915,006 A | 6/1999 | Jagadish et al. | |
| 5,918,217 A | 6/1999 | Maggioncalda et al. | |
| 5,943,656 A | 8/1999 | Crooks et al. | |
| 5,963,910 A | 10/1999 | Ulwick | |
| 5,963,939 A | 10/1999 | McCann et al. | |
| 5,970,130 A | 10/1999 | Katko | |
| 5,978,780 A | 11/1999 | Watson | |
| 5,987,434 A | 11/1999 | Libman | |
| 5,991,310 A | 11/1999 | Katko | |
| 5,991,739 A | 11/1999 | Cupps et al. | |
| 6,009,411 A * | 12/1999 | Kepecs | 705/14 |
| 6,012,051 A * | 1/2000 | Sammon et al. | 706/52 |
| 6,029,195 A * | 2/2000 | Herz | 725/116 |
| 6,035,025 A | 3/2000 | Hanson | |
| 6,035,277 A | 3/2000 | Anbil et al. | |
| 6,076,080 A | 6/2000 | Morscheck et al. | |
| 6,078,897 A * | 6/2000 | Rubin et al. | 705/14 |
| 6,313,833 B1 | 11/2001 | Knight | |
| 6,397,193 B1 * | 5/2002 | Walker et al. | 705/16 |
| 6,412,012 B1 | 6/2002 | Bieganski et al. | |
| 6,463,585 B1 * | 10/2002 | Hendricks et al. | 725/35 |
| 6,533,418 B1 * | 3/2003 | Izumitani et al. | 351/204 |
| 6,609,118 B1 | 8/2003 | Khedkar et al. | |
| 6,745,229 B1 | 6/2004 | Gobin et al. | |
| 7,136,821 B1 * | 11/2006 | Kohavi et al. | 705/5 |
| 7,472,080 B2 * | 12/2008 | Goel | 705/26 |
| 2001/0032165 A1 | 10/2001 | Friend et al. | |
| 2002/0013631 A1 * | 1/2002 | Parunak et al. | 700/28 |
| 2002/0052803 A1 | 5/2002 | Amidhozour et al. | |
| 2002/0171662 A1 | 11/2002 | Lee | |
| 2003/0088449 A1 * | 5/2003 | Menninger | 705/8 |
| 2005/0261987 A1 | 11/2005 | Bezos et al. | |
| 2006/0178918 A1 | 8/2006 | Mikurak | |
| 2008/0077471 A1 * | 3/2008 | Musgrove et al. | 705/10 |

FOREIGN PATENT DOCUMENTS

| | | |
|---|---|---|
| EP | 1207696 A1 * | 5/2002 |
| JP | 411085846 | 3/1999 |
| JP | 11292021 A * | 10/1999 |
| JP | 2002334280 A * | 11/2002 |
| WO | 9833104 | 7/1998 |

OTHER PUBLICATIONS

Official Communication for U.S. Appl. No. 09/580,448, mailed on Mar. 3, 2003.
Official Communication for U.S. Appl. No. 09/580,448, mailed on Nov. 5, 2003.
Official Communication for U.S. Appl. No. 09/580,448, mailed on Feb. 4, 2004.
Official Communication for U.S. Appl. No. 09/580,448, mailed on Oct. 24, 2005.
Official Communication for U.S. Appl. No. 09/580,448, mailed on Jan. 31, 2006.
Official Communication for U.S. Appl. No. 09/580,448, mailed on Jun. 2, 2006.
Official Communication for U.S. Appl. No. 09/580,448, mailed on Jan. 24, 2007.
Official Communication for U.S. Appl. No. 09/580,448, mailed on May 7, 2007.
Official Communication for U.S. Appl. No. 09/580,448, mailed on Dec. 19, 2007.
Official Communication for U.S. Appl. No. 09/580,448, mailed on May 20, 2008.
Official Communication for U.S. Appl. No. 09/611,958, mailed on Sep. 12, 2003.
Official Communication for U.S. Appl. No. 09/611,958, mailed on Oct. 1, 2004.
Official Communication for U.S. Appl. No. 11/079,011, mailed on Feb. 28, 2006.
Official Communication for U.S. Appl. No. 11/079,011, mailed on Dec. 13, 2006.
Official Communication for U.S. Appl. No. 11/079,011, mailed on Jan. 10, 2008.
Official Communication for U.S. Appl. No. 11/079,011, mailed on Jul. 25, 2008.
Official Communication for U.S. Appl. No. 11/079,011, mailed on Jan. 8, 2009.
Freeman, "Keeping 'em happy," 8, 2000; Marketing News v34n10 PP: 21; Doialog file 15, Accession No. 53388340.
International Search Report for International Application No. PCT/US01/03659, mailed on Apr. 27, 2001.
Official Communication for U.S. Appl. No. 09/497,483, mailed on Jun. 17, 2002.
Official Communication for U.S. Appl. No. 09/497,483, mailed on Dec. 4, 2002.
Official Communication for U.S. Appl. No. 09/497,483, mailed on May 30, 2003.
Office Communication for U.S. Appl. No. 11/079,011, mailed Oct. 5, 2009.
U.S. Appl. No. 09/619,248 Non-Final Office Action, Mailed Jan. 21, 2010, 16 pages.

* cited by examiner

Internet Survey

1) Compared to an ISP (ISP) that ranked average in a national quality survey (where quality represents content, customer service and reliability), how much more or less would you expect to pay ($/month) for a ISP that:
   - ranked in the top 20% nationally__
   - ranked 10-30% above average nationally__
   - ranked 10-30% below average nationally__
   - ranked in the bottom 20% nationally__

2) Assuming you currently connect to the Internet by dialing up through your phone line Modem), how much more would you be willing to pay ($/month) for a connection that:
   - downloads content from the web 2 time faster__
   - downloads content from the web 10 times faster__
   - downloads content from the web 20 times faster__
   - downloads content from the web 100 time faster__

3) How much of this additional premium from 3) would you be willing to pay as a one time up front cost ($ for equipment, installation, activation, etc). for a connection that:
   - downloads content from the web 2 time faster__
   - downloads content from the web 10 times faster__
   - downloads content from the web 20 times faster__
   - downloads content from the web 100 time faster__

4) Assuming you currently have one email account through your current ISP, how much more would you be willing to pay ($/month) for:
   - 1 additional EMAIL accounts__
   - 2 additional EMAIL accounts__
   - 5 additional EMAIL accounts__
   - 10 additional EMAIL accounts__

5) Assuming you currently do not have any personal disk storage space (for file storage and personal web-sites) through your current ISP, how much more would you be willing to pay ($/month) for:
   - 1 Mbyte of disk storage space (store 10 content rich web pages, or a video clip)__
   - 2 Mbytes of disk storage__
   - 3 Mbytes of disk storage__
   - 5 Mbytes of disk storage__
   - 10 Mbytes of disk storage__

6) Compared to a ISP that required no time commitment for a contract to provide Internet service, how much less ($/month) would you expect to pay for a plan that requires a:
   - 3 month commitment__
   - 6 month commitment__
   - 1 year commitment__
   - 2 year commitment__

*Fig. 8*

METHOD AND SYSTEM FOR SELECTING OPTIMAL COMMODITIES BASED UPON BUSINESS PROFILE AND PREFERENCES

CROSS-REFERENCES TO RELATED APPLICATIONS

This is a continuation of pending patent application Ser. No. 09/580,448 filed on May 30, 2000 and entitled "SYSTEM AND METHOD FOR ASSISTING CUSTOMERS IN CHOOSING A BUNDLED SET OF COMMODITIES USING CUSTOMER PREFERENCES" by Scott Snyder, which is a continuation-in-part application Ser. No. 09/497,483 filed on Feb. 4, 2000, both of which are incorporated herein by reference in their entirety.

BACKGROUND OF THE INVENTION

The present invention relates to the sale of commodities, such as products and services, and more particularly, to a system and method for assisting customers in choosing a bundled set of commodities using customer preferences.

In current practice, the average customer has a difficult time sifting through the enormous number of options for commodities, such as products and services, in order to find the best selection. Moreover, the increasing number of vendors that sell similar products and/or services adds to the difficulty. For example, in one state alone, customers may face a choice between thousands of vendors with hundreds of different plans for telecommunication, entertainment (cable/satellite), and power services.

As an additional complicating factor, many vendors offer multiple services or products that a customer may be interested in obtaining. In order to encourage the customer to select one or more of their commodities, discounts are offered to customers who purchase multiple related commodities. Offering a package of services or products at a discounted price is known as "bundling". In addition to intra-company bundling discounts, many vendors may also have alliances with affiliate vendors such that a customer will receive a discount if he selects a certain commodity or bundle of commodities from an affiliated vendor.

In the utility services industry, continued deregulation is increasing the number of available options, as well as the customer confusion associated with the new choices. As barriers to entry for services, such as local phone service and cable are reduced, competition between service providers for customers will further intensify as the number of competitors increases. In response to the increased competition, many service providers offer discounts to customers that select a bundle of related services from that provider or a provider affiliate.

In addition, services are beginning to converge, with the same cable or wire serving multiple purposes. For example, some combination of television, Internet and telephone services can come through the cable TV line, or voice and data can travel simultaneously over traditional copper telephone wires. In response to this convergence and the increased competition resulting from deregulation, many service providers offer bundling discounts to customers for selecting seemingly unrelated services. For example, some cable companies are offering bundled packages that include telephone and cable services at reduced costs.

As a result of these numerous options, customers face various challenges. First, customers lack perfect information and are unaware of available choices. Second, customers are barraged with cryptic information from vendors that is difficult to decipher. The perpetual flood of new options that are offered for the purpose of attracting new customers exacerbates this problem. Third, many customers do not make optimum choices of the deals offered by the various vendors because they do not understand the choices in general, the impact the choices may have, and the cost of the choices. Many customers may be unaware of bundling discounts offered by vendors for customers that select a certain bundle of commodities. Fourth, significant time investment is required for customers to find all of the information they need to compare offerings and bundles of offerings from different vendors. Usually, it takes more time and effort than the average customer wants to exert. Finally, customers feel like they are at the mercy of the large "monopolistic" merchants and service providers.

Additionally, vendors must contend with their own set of issues. Vendors spend significant amounts of money on educating customers, selling products and offering service plans to customers. Vendors want to obtain new customers at a reasonable cost and minimize the impact of turnover on their business. For example, a telecommunication service provider may spend between $100-$350 to acquire each new customer. As competition increases, customer retention is also an issue.

Many vendors rely on conducting their own internal research studies in order to better understand their potential target audience. The marketplace is changing so rapidly that it is difficult for vendors to keep pace. Vendors need to remain current with their customer base and anticipate new services and products based on the changing needs of the customer.

One method of attracting and retaining customers has been to offer bundles of goods or services to customers at a discounted price. A targeted bundle of goods or services is usually directed to customers who might be interested in purchasing each of the commodities within the bundle.

Several systems and methods have been developed over the years to solve the above problems, but these systems and methods have many disadvantages. For example, many merchants or third-party resellers have web sites that offer side-by-side comparisons of products and/or services. One disadvantage of such a web site is that the customers have to spend a significant amount of time determining what is best based on their own subjective assessment of the value associated with the various options. Another disadvantage is that these web sites may not adequately inform customers of various bundling options that are available and do not give customers the ability to compare these bundling options.

Many web sites present only the "lowest cost" commodity, without considering customer preferences or available bundling discounts. If the product or service does not meet their needs, frustrated customers will either return the products or switch to different service providers. If the customer is looking for several related commodities, then the customer wants the set of commodities that offers the "best value" to him. That is, the commodity or set of commodities that meets the customer's specific needs and desired performance levels at the lowest effective cost.

Accordingly, an integrated system and method are needed to assist customers in selecting the best value for a set of commodities based on the customers' preferences, as well as to assist vendors in acquiring and retaining customers.

BRIEF SUMMARY

Accordingly, the present invention is directed to a system and method that substantially obviate one or more of the problems due to limitations and disadvantages of the related art. An object of the present invention is to provide a system and method for assisting the customer in finding the optimal set of products and/or services based on the customer's preferences. Customers determine preferences and the relative weight of the preferences, and the system and method of the present invention use this information to generate the optimal set of commodity options that best meet the expressed preferences of the customers. As a result, customers save time and money and find the best products/services that meets their needs.

Another object of the present invention is to provide a system and method for assisting vendors selling commodities in acquiring and retaining customers by directing customers to the commodities at a lower cost to the vendor.

Additional features and advantages of the invention will be set forth in the description, which follows, and will be apparent from the description, or may be learned by practice of the invention. The objects and other advantages of the invention will be realized and attained by the structure particularly pointed out in the written description and claims hereof as well as the appended drawings.

To achieve these and other advantages in accordance with the purpose of the invention, as embodied and broadly described herein, the present invention provides a method for assisting a customer in choosing a combination of commodities, wherein said combination comprises at least two commodity categories, and each commodity category has at least two options, comprising the steps of calculating an effective cost for each available option in each commodity category wherein the effective cost includes the customer's preferences; ranking the options by effective cost for each commodity category; for each commodity category; creating a grouping of options by selecting the highest ranked option for that commodity category into the grouping; selecting any options in other commodity categories that are linked to the selected option selected into the grouping; if the grouping is not complete, selecting options for the remaining commodity categories, where the options selected for the remaining categories are not linked to any options which are in any of the categories from which options have already been selected for this grouping, into the grouping until the grouping is complete; calculating the total effective cost of each grouping; and presenting the groupings as combination offerings to the customer, whereby the customer selects a grouping for purchase.

In another aspect, the present invention provides a system for assisting a customer in choosing between commodities based on preferences of the customer that includes an optimizer device that is connected to a network, wherein the customer uses a customer device for connecting to the optimizer device via the network and sending preferences of the customer to the optimizer device, and wherein the optimizer device includes at least one database that contains information, including bundling information and links about at least one commodity, and at least one utility function, and a processing component for presenting to the customer a list of commodities containing at least one commodity based on the preferences and the utility function.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a sample survey for use in calculating utility equations for an Internet Service Provider;

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

The present invention provides an integrated system and method to assist a customer in selecting a best value combination of commodities based on customer preferences and to assist vendors in obtaining and retaining customers. In particular, the system of the present invention determines the optimal commodity choices for a customer based on values that the customer assigns to key features, attributes, or performance characteristics of the commodities that the customer is shopping for and the relative importance of those features, attributes, or performance characteristics to the customer. As a result, the present invention enables a customer to select the "best value" combination of commodities, rather than just selecting the "lowest cost" combination.

The system of the present invention may make these determinations for multiple related commodities in parallel, so that the customer can make the best value choice for a combination of commodities. This is an important feature, as the whole is not always equal to the sum of the parts. That is, a set of commodities purchased together may be a better value to a customer than if they were purchased separately. By considering available bundling discounts, the system enables the customer to receive the best value combination of commodities.

The system of the present invention is not limited to any particular product or service. The selection of any type of commodity, including but not limited to goods, products, services, and/or service plans, can be optimized by the system of the present invention. The system of the present invention incorporates any available bundling discounts. Typically, bundling discounts are available for bundles of related commodities, such as the bundling of local, regional, long distance and calling card telephone services. However, unrelated commodities may also be bundled. Any discounts provided by a vendor for the purchase of separate commodities will be considered by the system when performing the optimization function.

The components of the system will be described now, followed by a description of the operation of the system.

Figure 1:
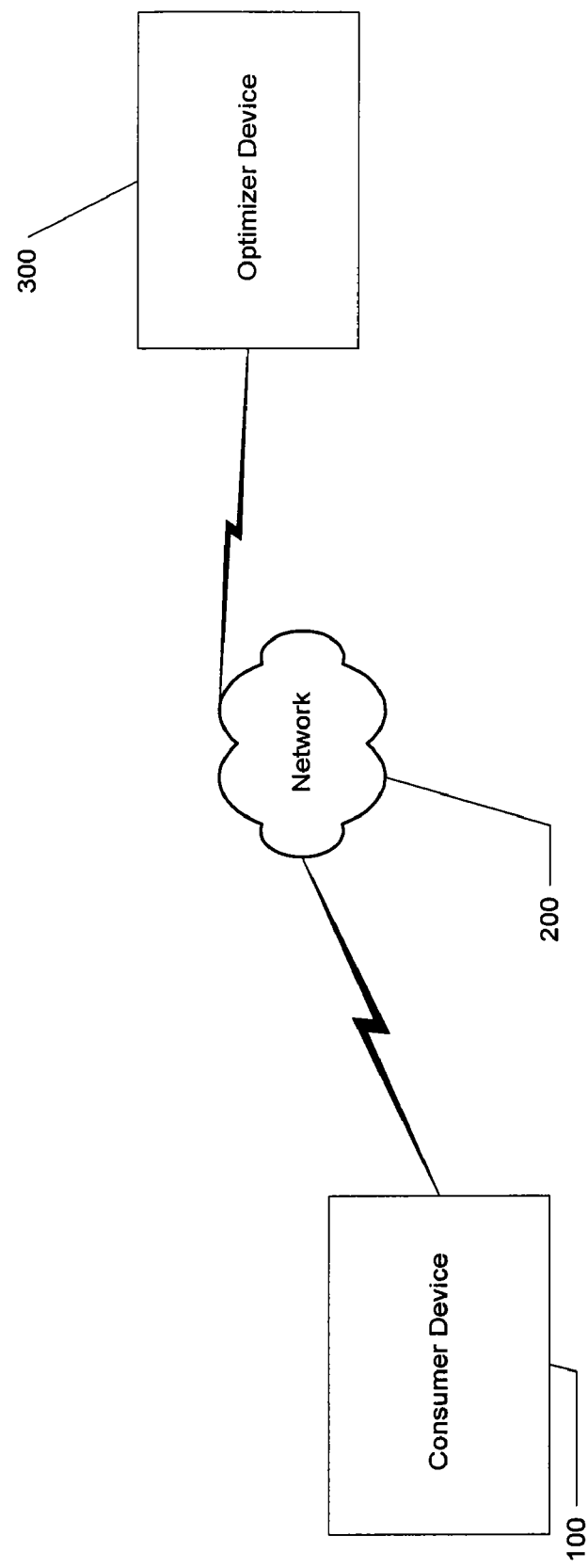
FIG. 1 is an overall system block diagram of a preferred embodiment of the present invention.

With reference to FIG. 1, a preferred embodiment of the system in accordance with the present invention includes an optimizer device 300 that is connected to a network 200. A customer device 100 accesses the optimizer device 300 through the network 200. Network 200 may be any type of computer network, such as the Internet, an Intranet, or an Extranet, for example. Access devices, such as phone lines, cable lines, fiber optic cables, or wireless communication systems may be used to access the network 200. One or more types of access devices may be used to connect to the network 200. For example, the customer device 100 may access the network 200 using a wireless communication system, whereas the optimizer device 300 may access the network 200 using fiber optic cables. This and other networks and access device configurations will be known to those skilled in the art, and are within the scope of this invention. The structure of the customer device 100 and the optimizer device 300 will be described next.

Figure 2:
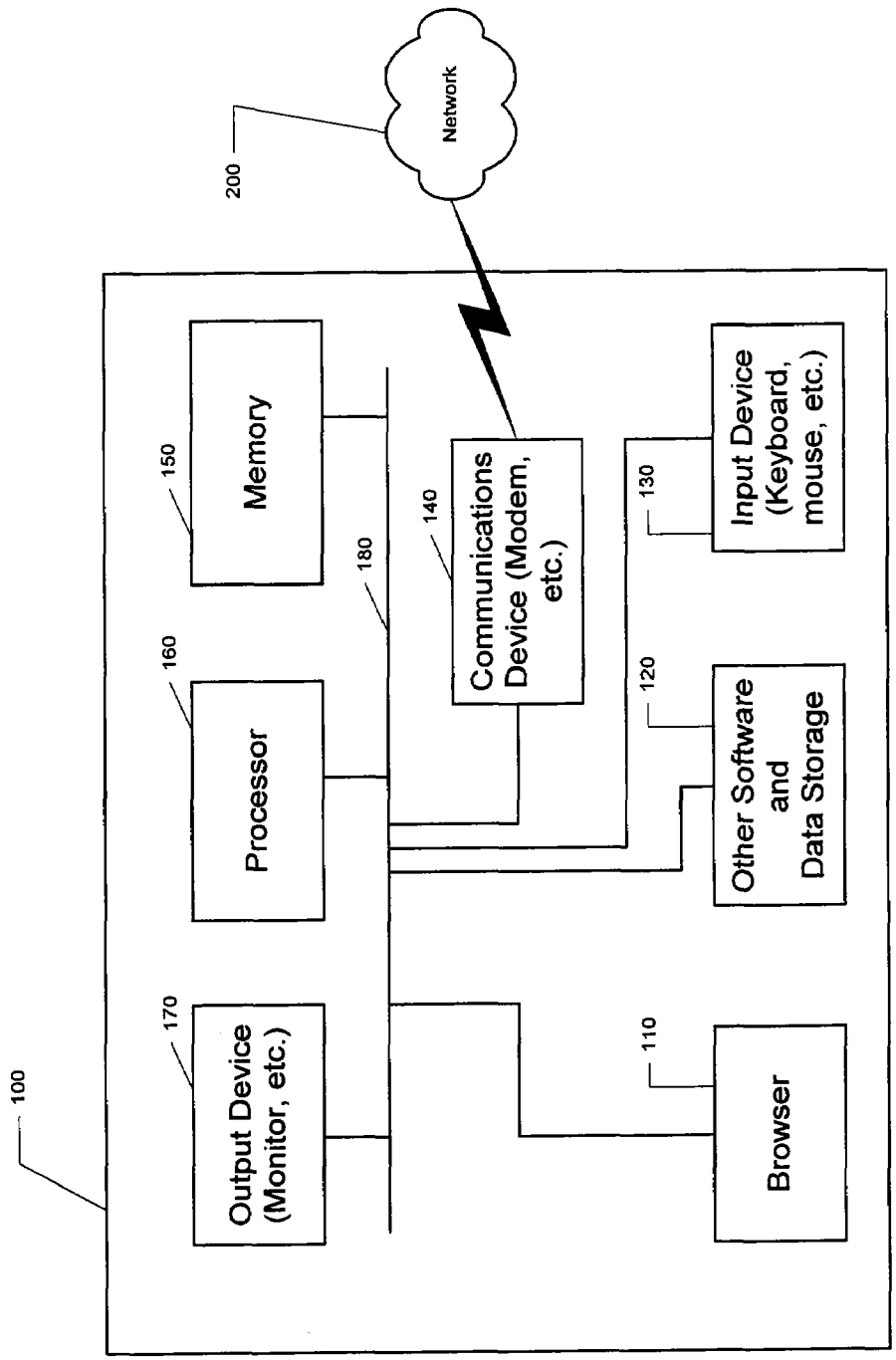
FIG. 2 is a block diagram illustrating the components of the consumer device 100 shown in FIG. 1.

Customers in the system of the present invention may include, but are not limited to, consumers, businesses or government entities. The customer device 100 is used by a customer to access the network 200. The customer device 100 may be a personal computer, a handheld computer or any similar device known to those skilled in the art. As shown in FIG. 2, the customer device 100 may include a browser 110, such as a world wide web browser; other software and data storage 120; at least one input device 130, such as a keyboard or a mouse; at least one communications device 140, such as a modem; at least one processor 150; memory 160; and at least one output device 170, such as a monitor; all of which may communicate with each other, for example, via a communication bus 180. The memory 160 may be Random Access Memory (RAM), Read Only Memory (ROM), or both. Other customer devices and their components will be known to those skilled in the art, and are within the scope of the present invention.

Figure 3:
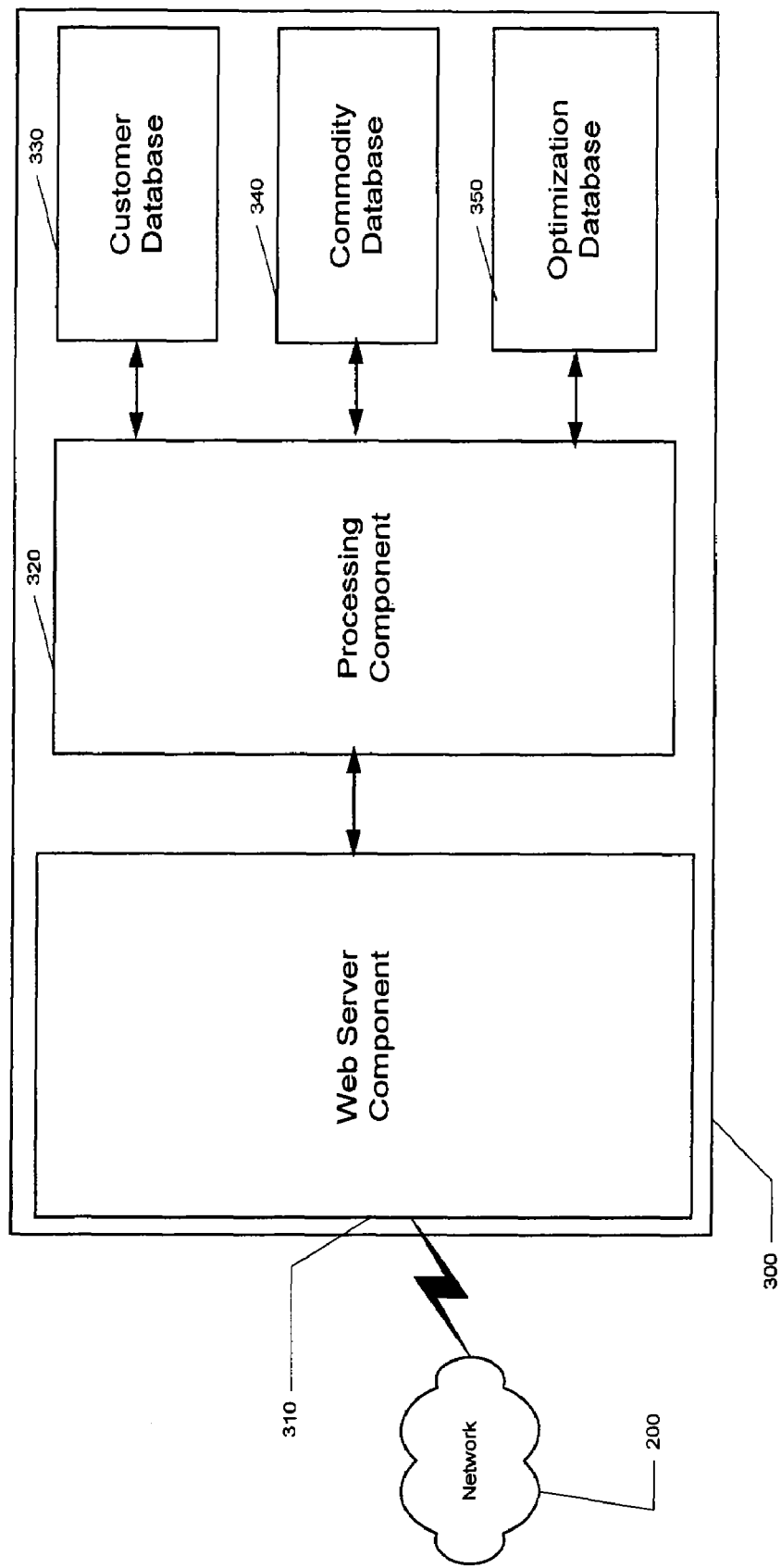
FIG. 3 is a block diagram illustrating the components of the optimizer device 300 shown in FIG. 1.

The optimizer device 300 shown in FIG. 1 will be described now. As shown in FIG. 3, the optimizer device 300 may include a web server component 310, a processing component 320, a customer database 330, a commodity database 340, and an optimization database 350. The optimizer device 300 also may include at least one administrative interface for administering the various components. Other devices and their components will be known to those skilled in the art, and are within the scope of the present invention. Some of the components shown in FIG. 3 will be described in detail along with the description of the system's operation.

Each of the components of the optimizer device 300 will now be described. The web server component 310 may be used to host a web site. The processing component 320 may include optimization and database interaction routines. The web server component 310 and the processing component 320 may be used to obtain information from the customer, such as name and preferences, which is then stored in the customer database 330.

The commodity database 340 stores information on the vendors and commodities. Vendors in the present invention may include, but are not limited to, merchants, service providers, government entities, and non-profit organizations. Vendors may sell or lease the commodities or they may provide these commodities free. The administrative interface may be used to enter information about these vendors and their commodities into the commodity database 340. The vendors and commodities may be indexed in the commodity database 340 by categorizing them into a category. For example, all vendors that sell automobiles may be categorized into a vehicle category. The commodity database 340 may include quality, features, and price information for a commodity. For example, if the commodity category is Internet Service Provider (ISP) plans, the commodity database may include information about ISPs such as the geographic area where an ISP provides service, monthly cost, usage cost per hour, equipment cost, connection speed, disk space, number of email accounts, quality rating, contract length, and termination fee. The quality rating may be a third party rating or a rating based on previously collected samples of customer responses to questions asked on the web site.

The commodity database 340 preferably stores bundling information, such as predefined bundling categories, the bundling links between commodities and the discount that is available for selecting a bundle of commodities. Preferably, there is a field in the commodity database for each commodity that contains links to the other commodities within a bundle. Alternatively, bundling information may be stored in a separate database.

For example, in the telephone services industry, there are typically a number of different types of bundling packages available, such as different combinations of local, regional toll, long distance and calling card service plans. An example of a bundled telephone services plan is a package of Bell Atlantic local phone service and Bell Atlantic regional toll phone service. In this example, Bell Atlantic offers a discount to customers who use Bell Atlantic for both local service and regional toll call service. Another example of bundled telephone services is Frontier, who offers local, regional toll, long distance and calling card plans as a packaged bundle. Customers who use Frontier for their local, regional toll, long distance and calling card service receive a discount.

In the Bell Atlantic example, the commodities database for the telephone services industry preferably contains a bundling field that links Bell Atlantic local service with Bell Atlantic regional toll service. In the Frontier example, the Frontier local service is linked to Frontier regional toll, Frontier long distance and Frontier calling card plans.

Preferably, the price information in the commodity database 340 for a bundled commodity reflects the bundling discount.

The optimization database 350 stores utility functions, constants, supporting statistics, and other optimization equations. The utility function may be an equation for calculating a quantitative value, such as a dollar value, that a customer associates with the key features, attributes, or performance characteristics of a commodity. For example, in the case of an ISP, the optimization database 350 may contain utility functions for calculating the value that the customer associates with connection speed, amount of disk space, quality of the service provider, number of email accounts, service contract length, and termination fee associated with early termination. For telephone services, the optimization database 350 may contain utility functions for calculating the value that the customer assigns to service features, such as call waiting, quality of service, contract length and termination fee. The utility functions are evaluated to obtain values that quantitatively represent a cost or benefit of the key parameters to the customer.

The optimization database 350 also stores other optimization equations, such as estimated cost equations and effective cost equations. Estimated cost equations represent the cost of a commodity to a customer based on the customer's usage characteristics. For example, in the case of an ISP, the estimated cost equation is based on usage of the Internet service and will be explained with the description of the operation of the system. The estimated cost equation may also include other costs or savings, such as online billing costs or savings if the customer requests online billing. Effective cost equations, on the other hand, include the values obtained from evaluating the utility functions, estimated cost equations, and any other costs, such as amortization costs. If the utility function represents a benefit to the customer, then the value is subtracted from the estimated cost. On the other hand, the value is added to the estimated cost if it represents a cost or burden to the customer. These equations and utility function will be explained in detail with the description of the operation of the system.

Figure 4:
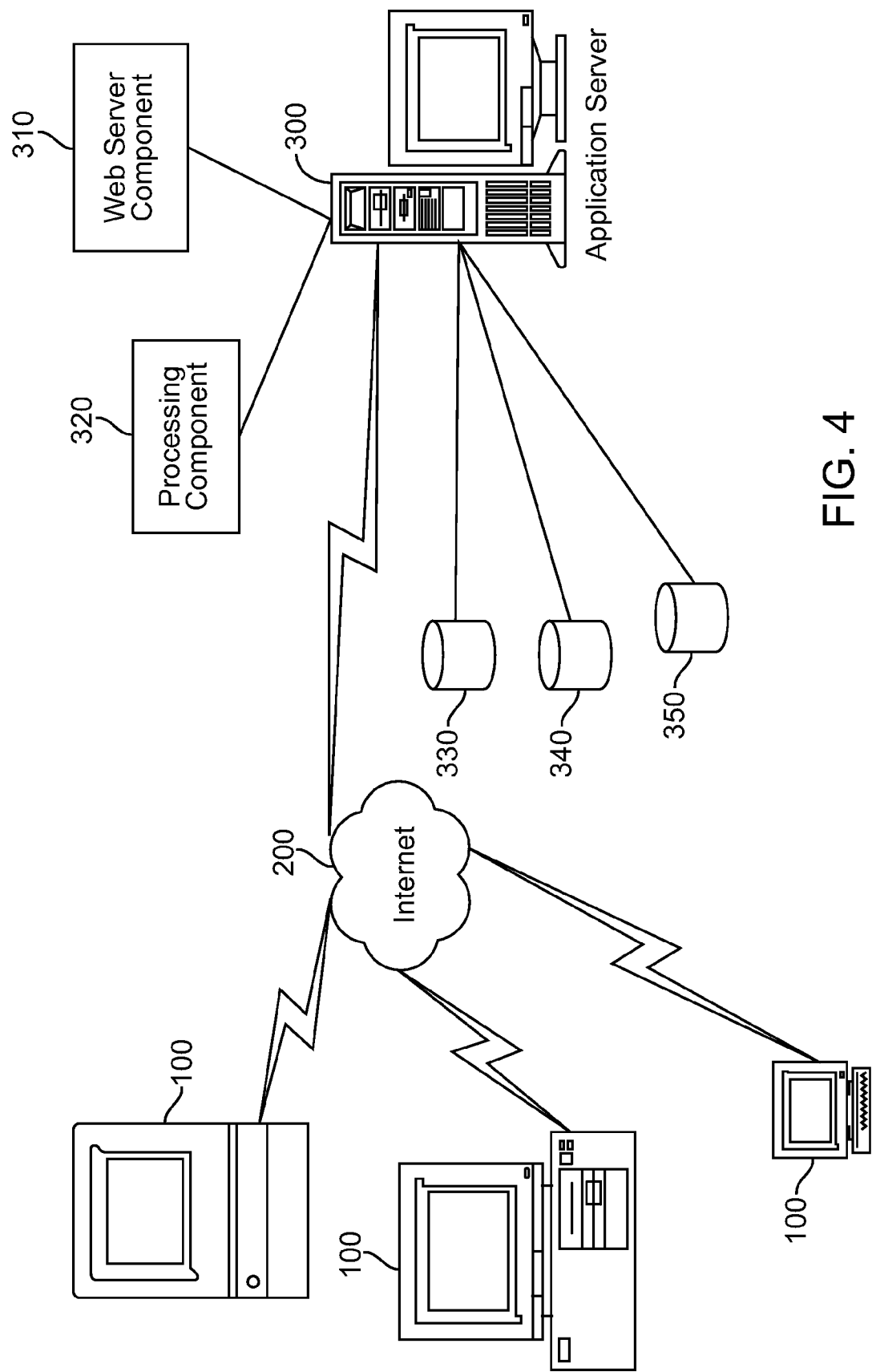
FIG. 4 is a block diagram illustrating an example of a system of the present invention.

Two examples of how the system of the present invention may be implemented will be described now by referring to FIGS. 4 and 5. As shown in FIG. 4, a customer may use a desktop computer or laptop computer as customer device 100. This computer may contain all the components shown in FIG. 2. At the other end, the application server may be used as the optimizer device 300. This server may include the web server component 310, processing component 320, customer database 330, commodity database 340, and optimization database 350. Optimizer device 300 and customer device 100 are connected to each other via the Network 200, such as the Internet. The customer may use the communications device 140 in his computer to connect to the Internet and access the web site hosted by the web server component 310 on the server using the browser 110 and standard Internet protocols.

Figure 5:
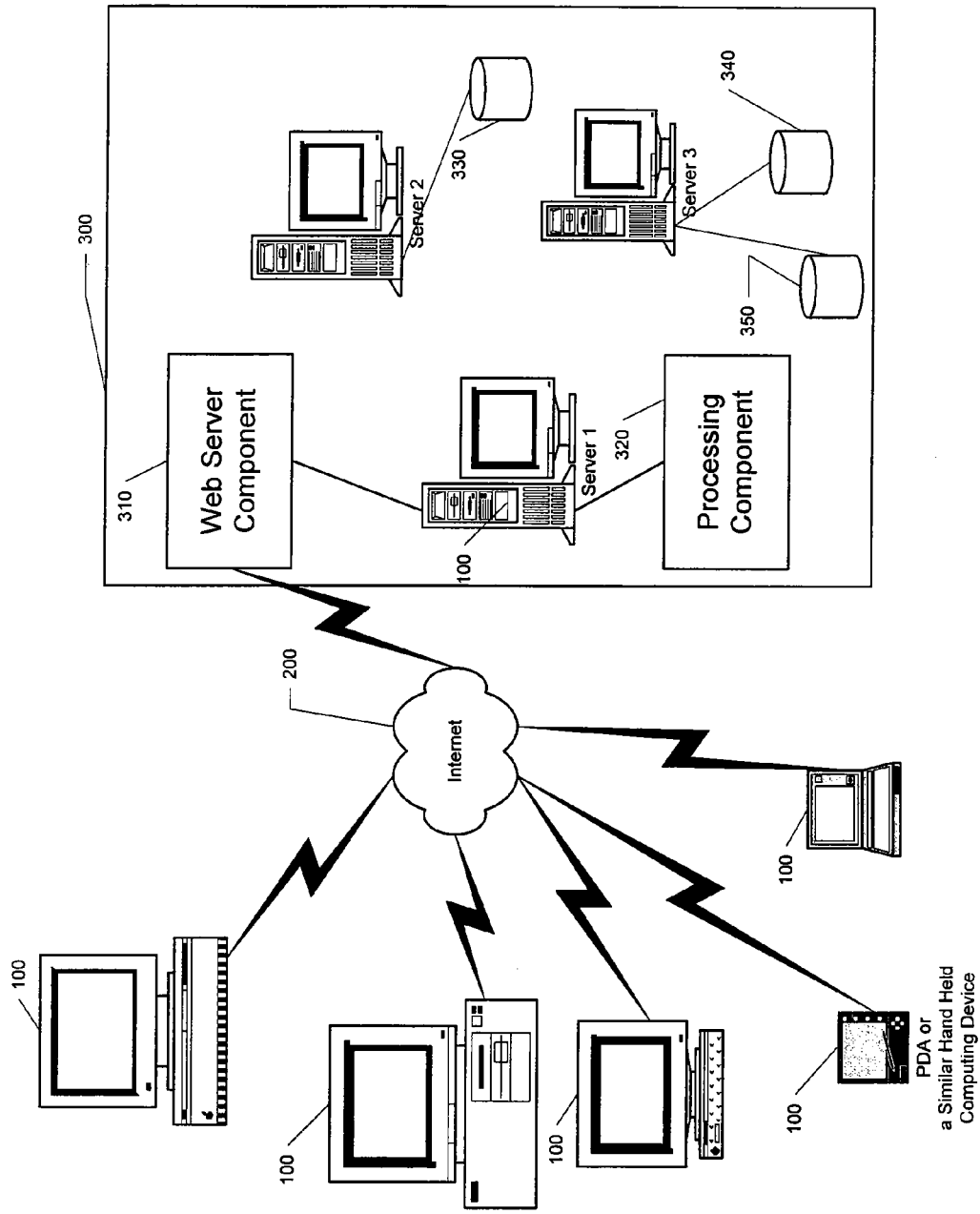
FIG. 5 is a block diagram illustrating a second example of a system of the present invention.
Figure 6:
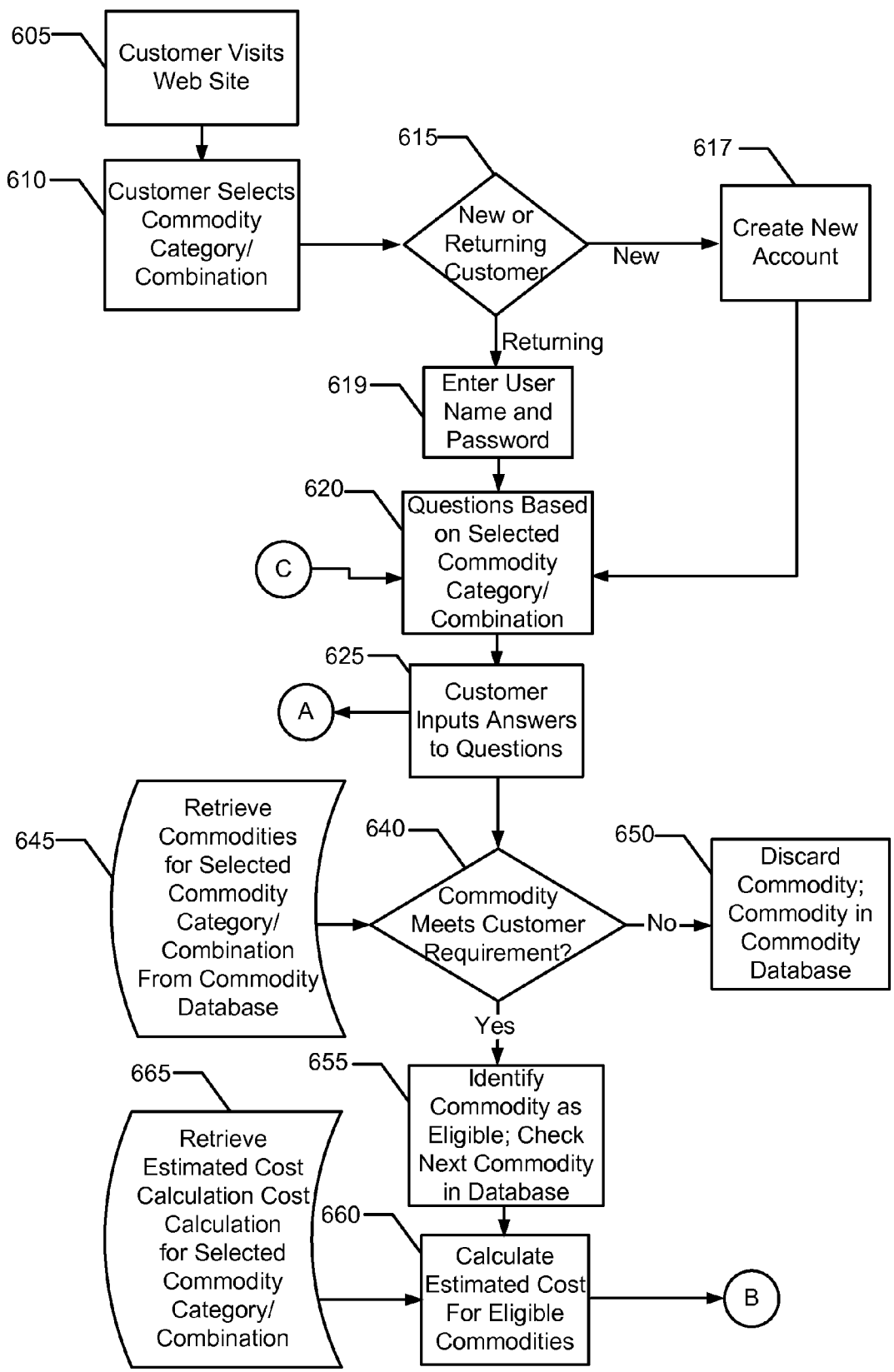
FIG. 6 is a flow chart depicting one embodiment of an operation of the present invention.

FIG. 5 shows a second implementation and is similar to FIG. 4 with the exception of the optimizer device 300. In FIG. 5, the optimizer device 300 consists of three servers, instead of one. Moreover, these three servers may be connected to each other, for example in a Local Area Network (LAN). More servers assist in load balancing and keep customers from getting frustrated. The web server component 310 may run on Server 1 and the other components of the optimizer device 300, such as the customer database 330, commodity database 340, and optimization database 350, may run on Servers 2 or 3. Depending on the amount of traffic to the web site, more servers may be added if needed. The present invention is not limited to the above examples. Other implementation configurations will be known to those skilled in the art, and are within the scope of the present invention.

The operation of the system will be described now with reference to FIGS. 6-10. In step 605 of FIG. 6, the customer uses the customer device 100 to visit the web site hosted by the web server component 310. For example, the customer may use the browser 110, such as Netscape Navigator, to visit the web site. When the customer visits the web site, he is preferably presented with optimization choices. For example, the customer may be presented with a list of commodity categories, such as four-wheel drive automobiles or Internet Service Provider (ISP) service plans. In addition to categories, the list may include predefined sets of commodities, such as "telephone services", which includes local telephone service, regional toll service, long distance service and calling card service.

The customer selects the desired commodity category or combination, as indicated by step 610. For example, if the customer desires to purchase a camera, the customer selects the camera category. If the customer desires to purchase local, regional toll, long distance and calling card telephone service, the customer selects the telephone services combination. A "combination" in the system of the present invention is defined a set of commodity categories, wherein the combination contains one commodity option from each commodity category. Typically, combinations are comprised of related commodities, such as telephone services. There are many different types of bundling discounts available to purchasers of various commodities. Predefined combinations are typically defined such that vendors' bundling discounts are included.

Typically, the customer is interested in purchasing a commodity from each commodity category within a combination. When these types of combinations are predefined by the system, the customer does not have to determine the commodity categories from which to select commodities. For example, when consumers purchase telephone service, they typically want local phone service, regional toll service, long distance service and calling card service. In the preferred embodiment, the predefined "telephone services" combination will include these four commodity categories.

Preferably, the commodity categories that are included within a predefined combination are shown to the user when the user selects a combination at step 610. Alternatively, the user may define a custom combination. For instance, if a particular user is not interested in calling card service, that user may define a custom telephone services combination that only includes local, regional toll and long distance services.

After selecting a category or combination, the customer is asked to enter system account information, as indicated by step 615. If the customer is a new user to the system, the customer is asked to enter personal information, such as name, address, e-mail address, and a password for future visits to the site, as indicated by step 617. Once the customer provides this information, the system creates an account for the customer and the system presents the customer with questions relating to the desired commodity or combination of commodities, as indicated by step 620. Alternatively, if the customer already has an account with the system, the system asks the customer for a user name and password at step 619. The account information may be stored in the customer database 330. Other customer authentication schemes known to those skilled in the art may be used and are within the scope of the present invention.

Once the customer is authenticated, the system presents the customer with questions relating to the selected commodity category or combination of commodities, as indicated by step 620. In particular, the system asks for the customer's hard requirements, geographic location (if required), usage characteristics and preference weightings for the selected commodity category, or for each of the commodity categories within a selected combination.

Hard requirements may include requirements that the customer absolutely needs in a commodity and/or geographic area information. For example, if the customer is shopping for a four-wheel drive vehicle, the customer may indicate that as a hard requirement. If the customer is shopping for an ISP plan, the customer may choose to make connection speed, disk storage space, number of e-mail accounts, quality, and/or price hard requirements. The geographic area is an automatic hard requirement in the case of an ISP because some ISPs only provide service in certain areas.

Preferences may include the customer's preferences about certain features of the commodity. Preference weightings may indicate the relative importance of these preferences against each other. For example, if the customer is shopping for a new ISP plan, the system may request the name and plan information of the customer's current service provider and a current estimated monthly bill. The system may also ask the customer to rate his current service provider. This rating may be used to calculate future quality ratings associated with an ISP, including the ratings used for the customer's optimization. The system may also request the customer's estimated approximate usage per month, the current connection speed (CSref), the desired number of e-mail accounts (EMref), the desired amount of disk storage space (DSref), and the desired contract length (CLref). The system may also request the customer to weigh the importance of connection speed, disk storage space, number of e-mail accounts, quality, and price. The customer may be asked to weigh the importance in percentages. In an alternative embodiment, the customer may be required to assign percentages so that the percentages add to a hundred percent. For example, a customer may enter his importance ratings as connection speed disk space (10%), number of e-mail accounts (10%), quality (20%) and price (30%).

If the customer is using the optimizer to select a set of commodities, he will be asked questions relating to each of the commodity categories in the combination. For example, if the customer selects a predefined telephone services combination at step 610, the system may ask the customer for information about the customer's current telephone services plans. The system may also request the estimated number and length of regional toll calls, long distance calls and calling card calls the customer will make in a month, and the desired phone service features and contract length. The customer may be asked to weigh the importance of certain features, and weigh the importance of quality against price.

In an alternative embodiment, some of the required information, such as geographic location or preference information may be retrieved from the customer database 330. This retrieved information may be the information that the customer provided to the system during the previous visits or during the account creation step. Moreover, the customer may be presented with this retrieved information and may be given the choice to amend this information rather than having to enter everything again.

After the customer inputs the required information, the system queries the commodity database to find the eligible commodities that meet the customer's hard requirements that were entered in step 625. For example, if a customer is shopping for four-wheel drive vehicles, the system will query the commodity database for four-wheel drive vehicles. As another example, if a customer shopping for an ISP plan has a hard requirement of at least two e-mail accounts, only ISP plans serving the customer's geographic area and providing at least two e-mail accounts are considered by the system to be "eligible". Geographic area can be determined through Zip codes, area codes and exchanges, or any other method known to those skilled in the art. If a particular commodity does not match customer requirements, the commodity is discarded as a choice for the customer as shown by step 650. If a particular commodity meets the customer's hard requirements and geographic requirements, the system selects the commodity as eligible as shown by step 655.

If the customer selected a combination at step 610, the system evaluates the eligibility of every available option for every commodity category in the combination. That is, if the customer selected a set of commodities at step 610, the system performs steps 640-645-650-655 for every commodity in every commodity category in the combination. For example, if the customer selected the predefined telephone services combination at step 610, the system will perform steps 640-645-650-655 for all of the available options for local telephone service, regional toll service, long distance telephone service and calling card service.

In the preferred embodiment, every commodity option in a vendor's prepackaged bundle of commodities must be determined to be eligible for any of the options in the bundle to be eligible. For example, if a telephone service provider offers a discount for the purchase of both long distance service and calling card service, and the long distance service does not meet the customer's hard requirements, both the long distance service plan and the calling card plan are ineligible commodities for this customer. In an alternative embodiment, if the service provider also offers these plans independently of one another without the bundling discount, the eligibility of the non-bundled service plans that do not include a bundling discount may be determined separately.

As an example of the process for determining eligibility for commodities within a commodity category, consider a customer located in the 610 area code and 644 exchange area shopping for a new ISP plan. This customer requires that the ISP plan provide him with at least two e-mail accounts. Table 1 illustrates sample data from the commodity database before the query is executed.

After executing the query, the optimizer will discard Plan 1, even though it is eligible geographically, because it does not offer at least two e-mail accounts. Plan 4 is discarded because it is not in the customer's geographic area. The shaded columns in Table 2 illustrate that these choices are ineligible.

TABLE 1

| ISP Option | Plan 1 | Plan 2 | Plan 3 | Plan 4 | Plan 5 |
|---|---|---|---|---|---|
| Area Code + Exchange | 610-644 | 610-644 | 610-123 | 202-467 | 610-644 |
| Monthly Cost | 9.95 | 19.95 | 39.99 | 34.99 | 45.99 |
| Usage Cost (Per hr) | 0.50 | 0 | 0 | 0 | 0 |
| Equipment Cost | 0. | 0 | 120.00 | 59.00 | 79.99 |
| Connection Speed | 56 | 56 | 1000 | 1500 | 128 |
| Disk Space | 3 | 1 | 5 | 4 | 6 |
| EMAIL Accounts | 1 | 2 | 4 | 2 | 3 |
| Quality Rating | 2 | 4 | 3 | 4 | 5 |
| Contract Length | 0 | 0 | 6 | 12 | 6 |
| Termination Fee | 0 | 0 | 20.00 | 40.00 | 50.00 |

TABLE 2

| ISP Option | Plan 1 | Plan 2 | Plan 3 | Plan 4 | Plan 5 |
|---|---|---|---|---|---|
| Area Code + Exchange | 610-644 | 610-644 | 610-644 | 202-467 | 610-644 |
| Monthly Cost | 9.95 | 19.95 | 39.99 | 34.99 | 45.99 |
| Usage Cost (Per hr) | 0.50 | 0 | 0 | 0 | 0 |
| Equipment Cost | 0 | 0 | 120.00 | 59.00 | 79.99 |
| Connection Speed | 56 | 56 | 1000 | 1500 | 128 |
| Disk Space | 3 | 1 | 5 | 4 | 6 |
| EMAIL Accounts | 1 | 2 | 4 | 2 | 3 |
| Quality Rating | 2 | 4 | 3 | 4 | 5 |
| Contract Length | 0 | 0 | 6 | 12 | 6 |
| Termination Fee | 0.: | 0 | 20.00 | 40.00 | 50.00 |

After determining eligible commodity options, the system retrieves the estimated cost equations from the optimization database and calculates the estimated costs for each of the eligible commodities in steps 660-665. If the customer selected a combination at step 610, the system retrieves the estimated cost equations and calculates the estimated costs for each of the eligible commodity options in each commodity category in the combination.

As an example of effective cost calculations, consider the case of ISP plans. The effective cost calculation may be expressed in terms of the estimated monthly cost (EMC):

$$EMC = \text{Monthly cost} + \text{Usage Cost} * \text{Estimated Usage}.$$

In the equation above, the Monthly cost is the recurring monthly charge in dollars associated with a particular ISP plan; Usage Cost is the cost per time of use in dollars per hour and Estimated Usage is the customer's estimate of the amount of time he will spend using an ISP's services during a month.

For the three eligible plans listed in Table 2, the EMC can be calculated by using the estimated usage information that the customer entered in step 625 and by using the monthly cost and usage cost that was retrieved from the commodity database in step 665. Assuming that the customer entered 30 hours/month in step 625, the EMCs for the eligible plans listed in Table 2 are:

EMC (plan2)=$19.95
EMC (plan3)=$39.99
EMC (plan5)=$45.99

Next, the estimated cost is adjusted by the utility functions stored in the optimization database 350. The process of calculating the utility functions and associated constants will be described now with reference to FIG. 7. The process begins with the identification of the key parameters associated with a commodity category or each commodity category within a combination, as shown in step 710. These key parameters are parameters that affect the customer's decision and may include features, performance, or quality characteristics of a particular commodity category. For example, in the case of an ISP plan, the key parameters may be connection speed; disk space (which the customer, for example, may use for his or her web site); the quality of the connection; number of e-mail accounts; and the termination fee associated with such a plan. These parameters may be identified based on engineering judgment or may be based on a random survey of representative customers.

Next, in step 720, the range for each parameter is identified. For example, in the case of connection speed of an ISP plan, the range may be from less than 33 kpbs to 1500 kpbs. Once the ranges are identified, then the utility functions may be calculated by using regression analysis, engineering judgment, or a combination of both, as shown in steps 730, 735, 740, 745, and 750.

If regression analysis is used, a representative set of customers may be randomly sampled to obtain a quantitative value, usually a dollar value, associated with that particular parameter, as shown in step 735. For example, in the case of an ISP plan, a survey like the one shown in FIG. 8 may be sent to ISP customers. The dollar values may be then used to calculate a best-fit utility function via regression analysis, as shown in step 745.

Alternatively, the utility function may be calculated using engineering judgment, or a combination of regression analysis and engineering judgment, as shown in step 740. For example, engineering judgment may be used to adjust the utility function obtained through regression analysis. If needed, steps 730, 735, 740, and 745 may be repeated to calculate the utility functions for all of the key parameters associated with each commodity category, as shown in step 750. The utility functions may be calculated for a generalized sample group or for specific sample groups, such as by demographics, spending amount, etc.

For example, if the customer chose the commodity category of ISP plans, there may be five key parameters, and thus, five utility functions. If the customer selected the telephone services combination, local telephone service may have 5 key parameters, and thus, 5 utility functions; regional toll service may have 2 key parameters and 2 utility functions; long-distance service may have 6 key parameters and 6 utility functions; and finally calling card service may have 5 key parameters and 5 utility functions. In this case, the telephone services combination will have a total of 18 utility functions to calculate.

In the example of the ISP plan category, the five utility functions are:

a. $U(\text{connection speed}) = K_{cs} * P_{cs} * \ln(CS/CS_{ref})$
b. $U(\text{disk space}) = K_{ds} * P_{ds} * \ln(DS/DS_{ref})$
c. $U(\text{quality}) = K_q * P_q * \ln(Q/Q_{ref})$
d. $U(\text{email}) = K_{em} * P_{em} * \ln(EM/EM_{ref})$
e. $U(\text{termination fee}) = K_{tf} * TF * (CL - CL_{ref})/CL$ if $CL > CL_{ref}$, otherwise=0

In these five utility functions, Kcs, Kds, Kq, Kem, and Ktf are constants that will be described in step 765; Pcs, Pds, Pq, and Pem represent the preference weightings and will be described in step 765; CS, DS, Q, EM, and CL represent connection speed, disk space, quality, email, and termination fee, respectively, for a specific Internet Service Provider plan and are stored in the commodity database 340; CSref, DSref, Qref, EMref, and CLref represent the values entered by the customer in step 625, or predefined as average values (such as QRef).

In step 755, an independence check is done on each utility function versus the other utility functions for a given commodity using correlation, which may include regressing against the other utility functions. If correlation is present, the redundant utility term is either omitted from the equation or an interaction term of the form $K_3 * U_1(x) * U_2(x)$ is added to account for the relationship, as shown in step 760. After the independence check is completed, the constants for each utility function for which the customer provides a preference weighting, such as Kcs, Kds, Kq, and Kem, are adjusted by dividing the original regression constants by the expected value of the preference weighting range, as shown in step 765.

For example, in the case of an ISP plan, the customer is asked to provide a preference weighting over a weighting range of zero to one hundred for five parameters: price, quality, connection speed, disk space, and number of e-mail accounts. Thus, given equal importance of all parameters, the expected value of the preference weighting for each parameter is twenty. Accordingly, the constants, Kcs, Kds, Kq, and Kem, are calculated by dividing the original regression constants by twenty. Ktf is not adjusted since the customer does not input a preference weighting for the termination fee. Instead, the customer inputs the acceptable value of the contract length in months, which is used as the reference contract length, CLref. For example, in the ISP case, the constants are: Kcs=0.38, Kds=0.045, Kq=0.182, Kem=0.11, and Ktf=2.43.

Finally, the utility functions, along with the constants and the sample data used for regression analysis, are stored in the optimization database 350, as shown in step 770. Other methods of calculating utility functions will be known to those skilled in the art and are within the scope of the present invention.

Figure 9:
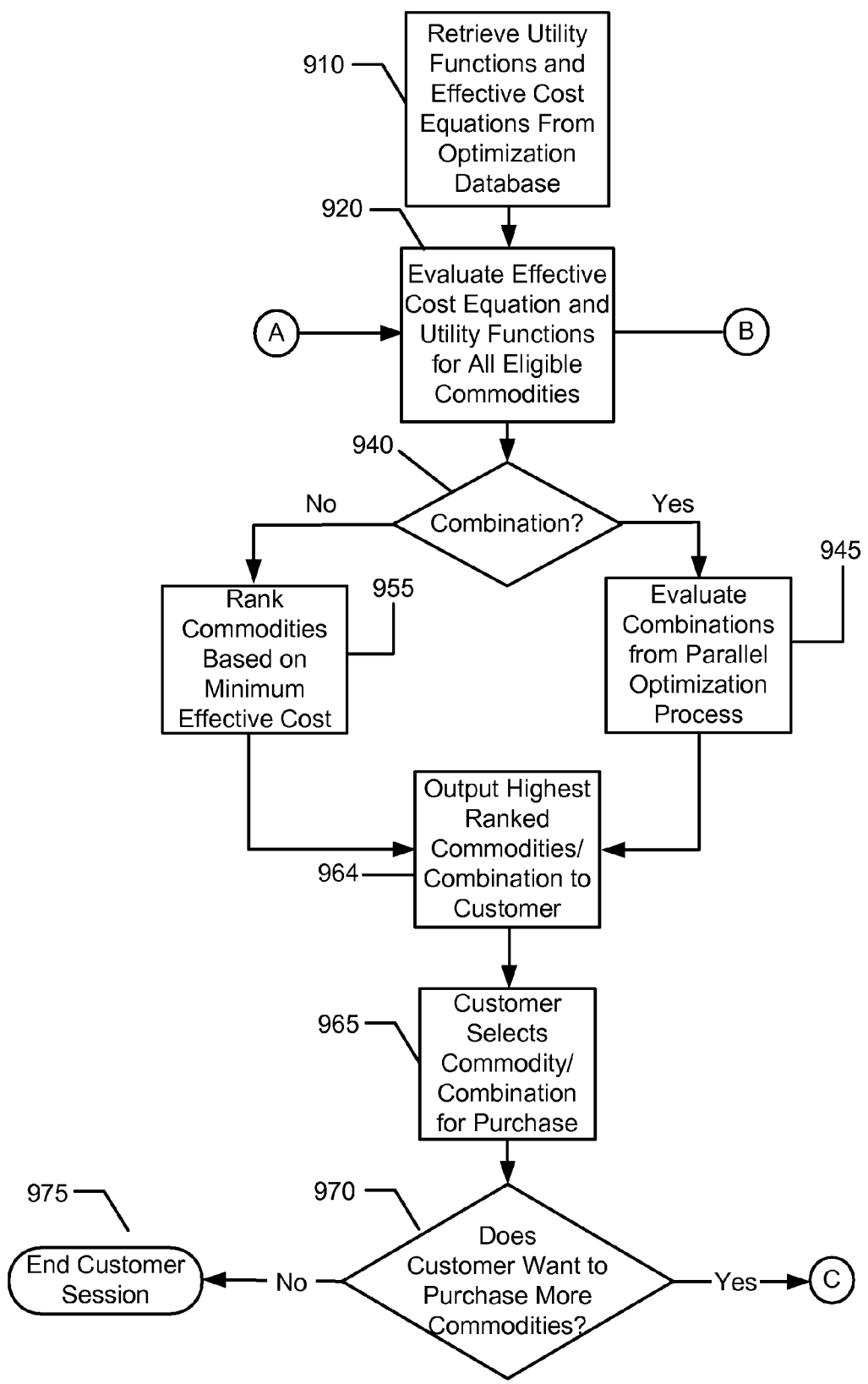
FIG. 9 is a flow chart depicting the effective cost calculation of the present invention.

As mentioned in the foregoing description, the estimated cost calculated in step 660 is adjusted by the values obtained from evaluating the utility functions that relate to the commodity or commodities that the customer desires to purchase. The value is subtracted from the estimated cost if it represents a benefit to the customer. On the other hand, the value is added to the estimated cost if it represents a cost or burden to the customer. FIG. 9 is used to describe this adjustment process. In step 910, the utility functions are evaluated with the information resulting from step 730, and from the optimization database from step 770. For example, in the case of the ISP plan, the utility functions, U(connection speed), U(disk space), U(quality), U(email), and U(termination fee), are evaluated. The resulting utility function values and other related costs are added or subtracted from the estimated cost to get the effective cost. As indicated by steps 910 and 920 the effective cost equations, in most cases, represent the sum of the utility function values, estimated costs, and any other costs, such as amortized fixed costs. For example, the effective cost equation for an ISP is:

Effective Cost=$EMC$+Amortized Fixed Costs−$U$(connection speed)−$U$(disk space)−$U$(quality)−$U$(email)+$U$(termination fee).

The Amortized Fixed Costs are equal to (Activation Fee+Equipment Cost)/Contract Length (CL Ref). The Amortized Fixed Costs and the value of the termination fee utility function are added to the EMC because these represent a cost or burden to the customer. Using the above equation, the effective costs for ISP Plan 1 is $27.2, Plan 2 is $18.6, Plan 3 is $32.5, Plan 4 is $60.5, and Plan 5 is $48.4.

The optimization process that has been described thus far is applied to each available commodity option that meets the customer's requirements. That is, the optimization process is applied to every eligible commodity option from step 655 of FIG. 6. If the customer chose a commodity category at step 610, the eligible commodities in that category are evaluated and ranked based on minimum effective cost at step 955. For example, Plan 2 is the highest ranked plan in the ISP case. The ranked commodity options for the selected commodity category are presented to the customer, as shown in step 964.

Next, the customer selects the commodity that the customer wants to purchase and the system processes the request, as indicated by step 965. Now, the customer has the option of either ending his session, such as by exiting his browser, or repeating this process for another commodity category or combination of commodity categories, as indicated by steps 970, 975, and 980.

The process described above can be used to determine a customer's best value option within a commodity category. However, if the customer chose a set of commodities at step 610 the system will need to evaluate possible combinations of commodities in order to determine the best value of a set of commodities through parallel optimization process 945.

Figure 7:
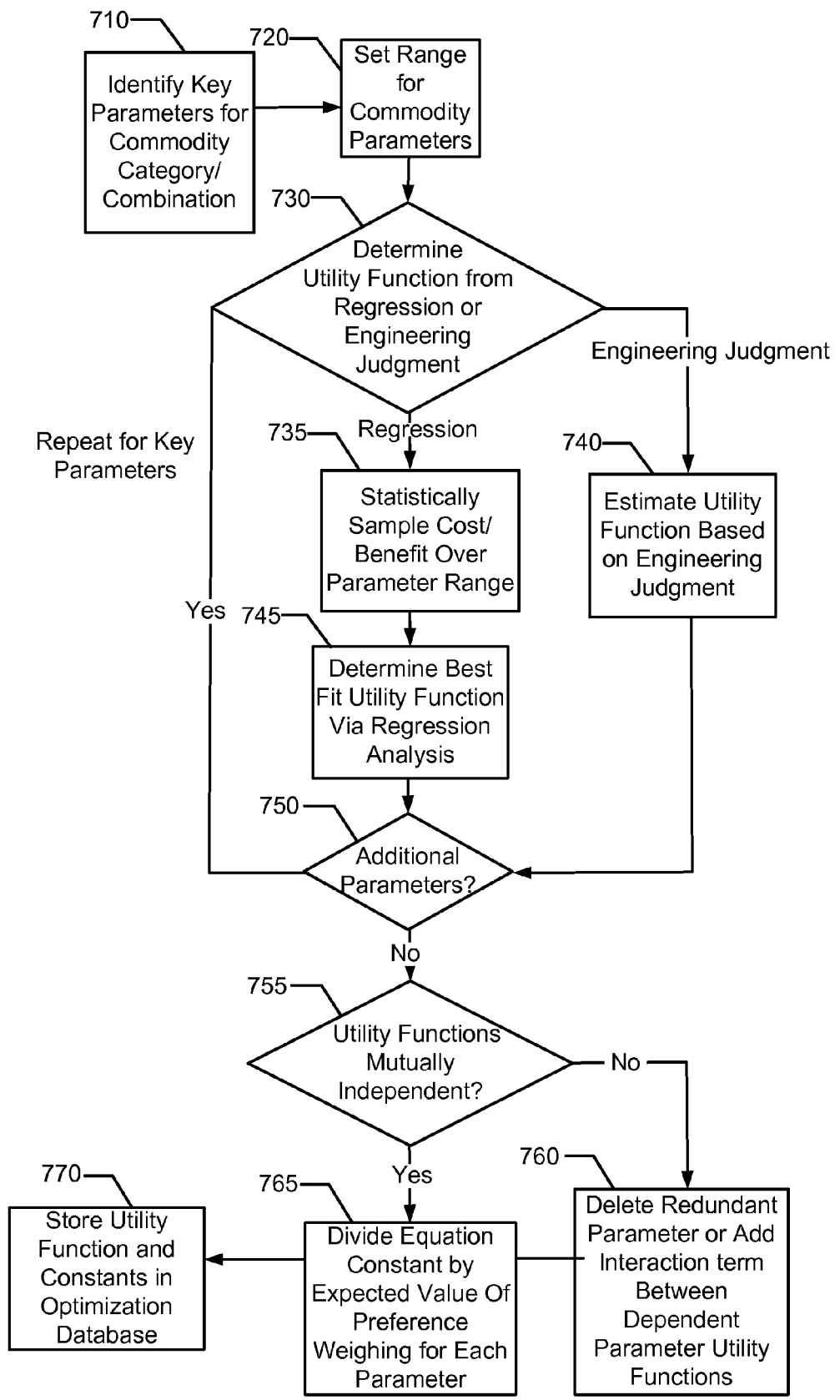
FIG. 7 is a flow chart depicting the process of deriving the utility functions of the present invention.
Figure 10:
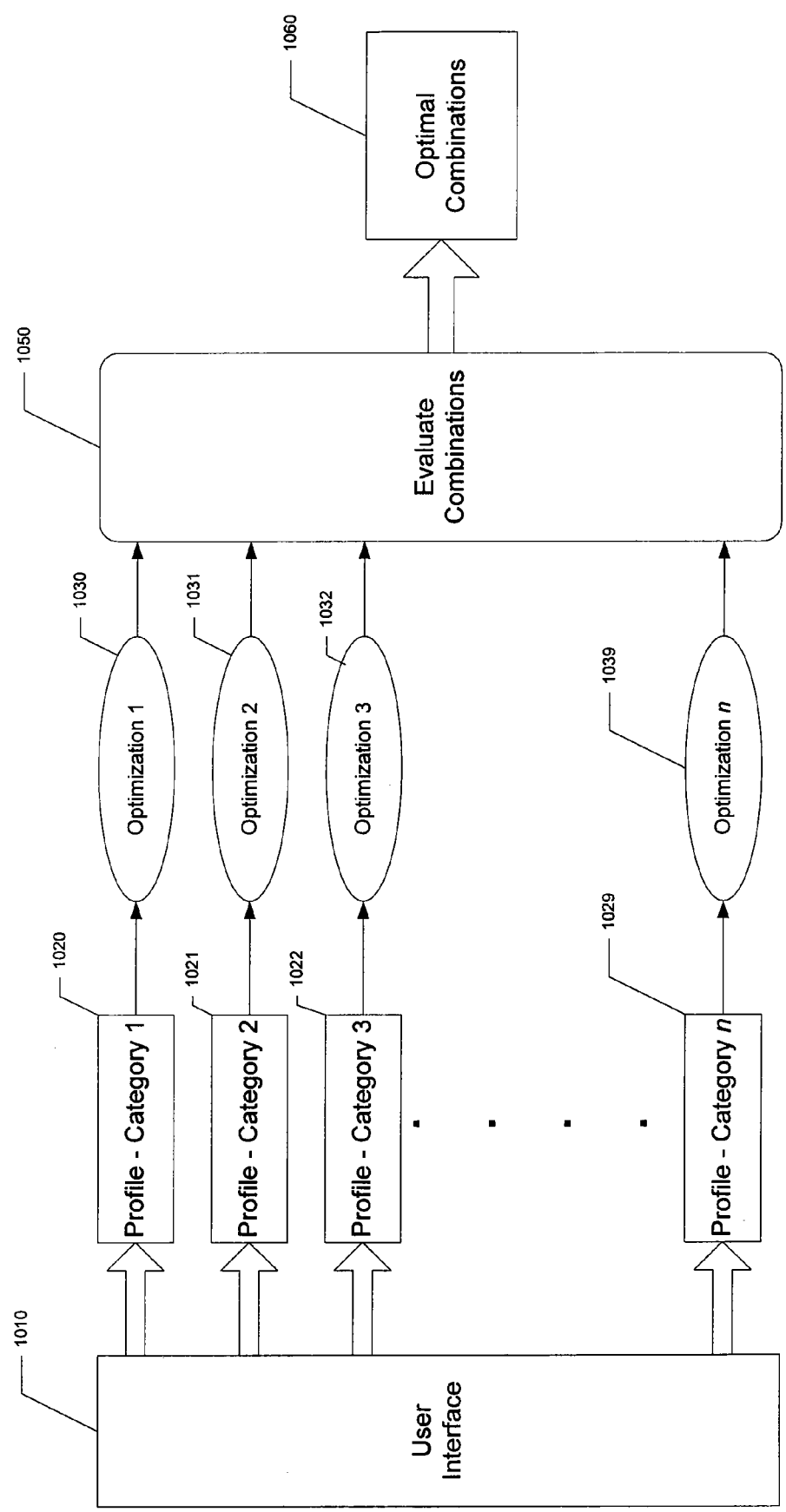
FIG. 10 is a block diagram depicting a preferred embodiment of the parallel optimization process.

FIG. 10 is a block diagram illustrating the overall process for parallel optimization that is used for optimizing combinations of commodities. As shown, the user inputs requirements and preferences for all the commodity categories within a combination through user interface 1010. From the user's requirements and preferences the system builds a profile for each of the commodity categories, 1020, 1021, 1022, and 1029. An optimization process is run for each of the n commodity categories in the combination as shown by optimization processes 1030, 1031, 1032, and 1039. In the preferred embodiment, the optimization process described in FIGS. 7 and 9 is used, however, other optimization techniques will be known to those skilled in the art, and come within the scope of the present invention.

The system of the present invention evaluates the results of the parallel optimizations at 1050 to determine the optimal package 1060. The highest ranked options are preferably presented to the customer, as indicated by step 964 in FIG. 9. Next, the customer selects the combination option that the customer wants to purchase and the system processes the request, as indicated by step 965.

In the preferred embodiment, when the customer selects a combination for purchase, the customer purchases all commodities in the selected combination. Alternatively, the customer may choose to purchase only some of the commodities from a selected combination. If the customer chooses to select individual commodities from a combination for purchase instead of purchasing the entire combination, the commodities selected must not violate any bundling rules. Preferably, the system will enforce any bundling rules when the customer makes his selection and disallow any invalid selections. For example, if Bell Atlantic offers local telephone service and regional toll service as a bundled package, and the customer attempts to select local telephone service from Bell Atlantic without regional toll service, this selection will not be allowed because it violates bundling rules.

As before, the customer has the option of either ending his session, such as by exiting his browser, or repeating this process for another commodity category or combination of commodity categories, as indicated by steps 970, 975, and 980.

As an example of the parallel optimization process, suppose a customer selected a predefined set of telephone services that includes local, regional toll, long-distance and calling card service plans. Alternatively, instead of selecting a predefined combination, the customer could have individually selected these four services as the combination of commodity categories to optimize.

The system prompts for the user's requirements and preferences for each of the four categories. The user's location, usage characteristics, requirements and preferences are then used to build profiles for the customer. In this example, the user provides the profile information as shown in Table 3.

TABLE 3

| Profile Information | |
|---|---|
| Location | Zip: 19312 |
| | Area code/exchange: 610-644 |
| Local phone features Location | Call Waiting |
| Estimated average number of regional toll calls per month | 12 minutes |
| Estimated average regional toll call length | 10 minutes |
| Estimated number of calling cards per month | 3 |
| Estimated calling card call length | 15 minutes |
| Estimated average number of long distance calls per month, and time of day | 5 (day) |
| | 10 (night) |
| | 15 (weekend) |
| Estimated average length of long distance calls | 10 minutes (day) |
| | 10 minutes (night) |
| | 20 minutes weekend |
| Quality vs. Price weighting | 70% quality/30% rice |

An optimization process is then performed for each commodity category within the combination using these user inputs. In this example, four separate optimization processes are run—local phone service, regional toll phone service, long distance phone service and calling card phone service. Based on the optimizer equations for local, regional toll, long distance and calling card plans, effective costs for eligible plans are calculated. The preferred process for determining which plans are eligible for a customer, and the preferred process for calculating the effective cost of each eligible plan were discussed earlier in the ISP plan example. The basic methodology is the same for phone services.

Results of the parallel optimization processes for the phone service combination example of Table 3 are shown in Table 4. As shown, service providers A, B, C, D, E and F have eligible local phone service plans for this customer. Service providers A, B, D, E and G have eligible regional toll service plans, and so on. The results are shown ranked by the calculated Effective Cost for each eligible commodity option in each commodity category. For example, service provider A has an estimated effective cost of $18.2 for local service, and is therefore the best value for local phone service in this example.

TABLE 4

| Local Phone | Regional Toll | Long Distance | Calling Card Plans |
|---|---|---|---|
| A (18.2) | G (9.4) | E (32.0) | J (5.0) |
| B (20.5) | A (11.1) | H (32.3) | G (6.3) |
| C (22.0) | E (13.2) | I (34.1) | I (6.5) |
| D (23.6) | B (13.5) | G (35.2) | E (7.1) |
| E (26.1) | D (14.5) | D (36.4) | D (7.9) |
| F (26.7) | | | |

As shown in this example, some providers, such as D, may provide service in each of the categories in the combination. Other providers, such as J, may only provide a service for one commodity category within the combination. As shown, service provider J has only a calling card service plan. Others, such as B, may provide some, but not all of the services. As shown, service provider B has local and regional toll service plans. Also, although a provider may actually offer service in each commodity category in the combination, one of that provider's service plans may not be eligible for the user, depending on the user's geographic restrictions and hard requirements. In this case, the system may consider all plans from that service provider ineligible for the parallel optimization process and discard every commodity option from that provider. Alternatively, the system may include only the eligible options from that provider. If only some of a provider's plans are eligible for the customer, any bundling discounts offered by that provider will not be considered, unless every plan required by the bundling discount is eligible.

Typically, plans from the same provider are linked into bundles, and if a customer selects one plan, he must also select all linked plans. In this example, it is assumed that plans from the same provider are all linked in a bundle. Therefore, in this example, if the customer selects service provider A for local phone service, the customer must also select service provider A for regional toll service. If the customer selects service provider E for long distance service, he must also select service provider E's local, regional toll and calling card plans.

In an alternative embodiment, plans from the same service provider that are linked in bundles may also have stand-alone pricing in which case they are represented as separate plans in the database. For example, a provider offers local and long distance service plans, and a 5% discount to customers who select both services. However, the long distance service plan may not be eligible for a particular customer based on that customer's hard requirements. In this case, the system may either consider all plans from that provider ineligible, or it may consider the local service plan eligible, however, this offering will not have the 5% bundling discount applied when evaluated by the system.

In another alternative embodiment, plans from separate providers may be linked. If this is the case, linking information will be stored in the commodity database, and customers will be required to select all linked plans from the separate providers.

In this example, each service provider has at most one option for each category, and plans from the same service provider are all linked into a bundle.

In the telephone services example, to determine the effective cost of every available combination of options would require over $6^4$ calculations. Therefore the system groups the highest ranked bundled options with the highest rated individual options to obtain combinations or groupings that are most likely to offer the best value to a customer. By considering the bundling links when creating combination groupings, far fewer combinations need to be evaluated.

A "grouping" is a set of commodity options selected one each from each commodity category within the combination. Groupings in the system of the present invention are different possible combination offerings for the selected combination. A grouping or combination offering may consist of options that are all linked together. A grouping may consist of entirely independent options. Alternatively, a grouping may consist of independent options together with linked options that together form a complete combination offering.

Figure 11:
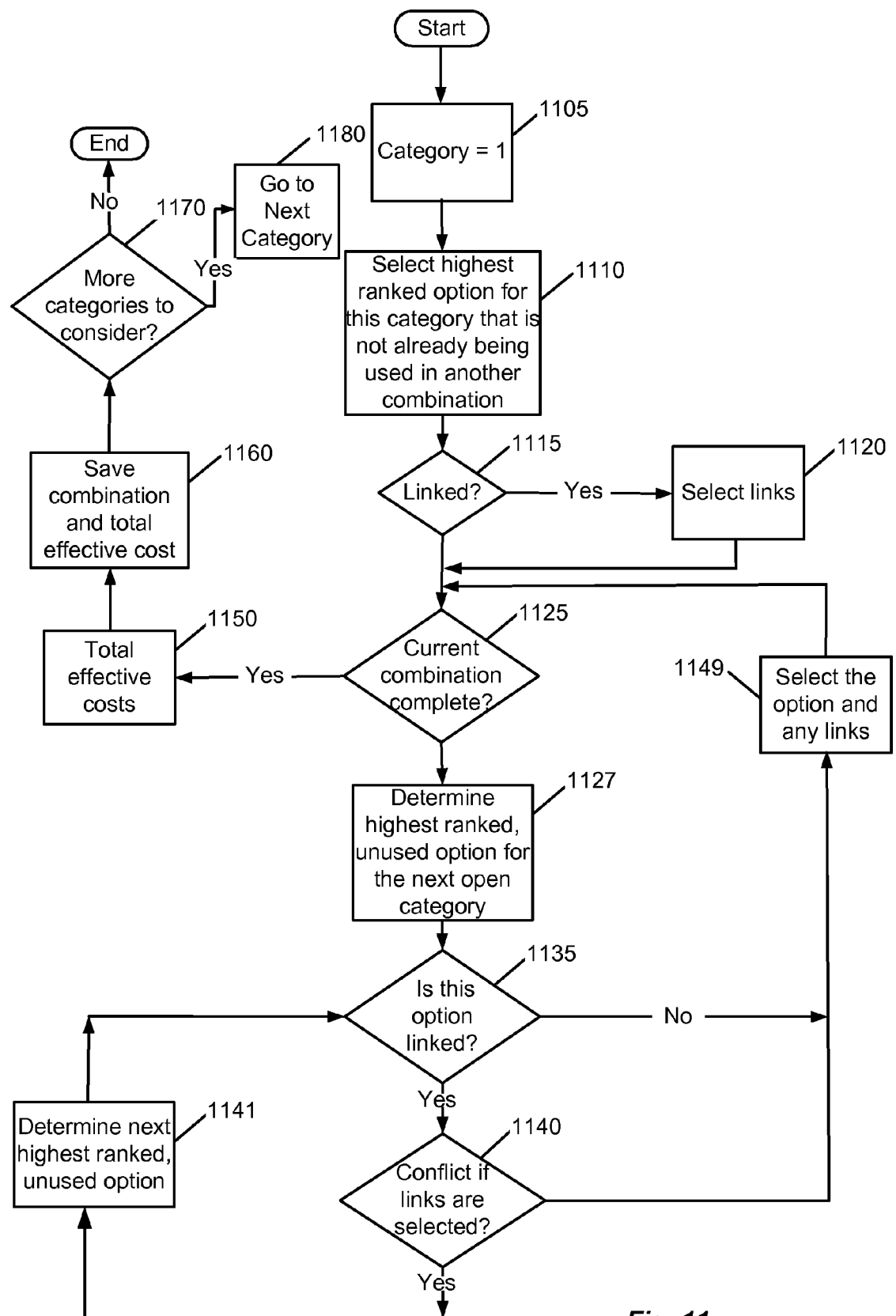
FIG. 11 is a flow chart depicting the process of creating groupings of bundles and individual options.

A preferred process for creating groupings for a combination is shown in the flowchart in FIG. 11. First, at step 1105-1110, the highest ranked option for a first category within the combination is selected for the first grouping of options. At step 1115, the system determines whether this option is linked to any options in any other combination commodity category. Preferably, this is determined through use of the commodity database. If this option is linked to any other options, those options are selected for this first grouping at step 1120. Linked options are selected regardless of their rankings.

Then the first grouping is evaluated to determine whether every combination category has an option selected at step 1125. If the first option selected for this grouping had no links, then every other category in the grouping is still open at this point. If the first option had links to options in every combination category, then all of those options were also selected into the first grouping at step 1120, and the first grouping is "complete", and therefore no more options need to be evaluated for this grouping. The process continues to step 1150 in this case. However, if there are any "open" categories in the grouping, then the system determines the highest ranked option in the next open category that has not already been used in a grouping, even if this option has already been used in another grouping.

A similar linking analysis is performed for this option at step 1135, and any linked options are added to the grouping, if possible. If there are conflicts, then the next highest ranked option for this category is evaluated. The best option that can be added to the grouping is selected with its links.

Once the first grouping is complete, the total effective cost for that grouping is calculated at step 1150. The grouping and its total effective cost are saved as an available combination offering at step 1160.

Preferably, this process is repeated for the highest ranked option for every category in the combination. If desired, the same process can be repeated for the second or third highest ranked options in every category to create additional grouping choices. The number of levels or ranks that the process is repeated for is preferably configurable. This is shown by step 1170.

For the example in Tables 3 and 4, the available groupings in Table 5 are determined using the process of FIG. 11. Table 5 also shows the total effective cost for each available grouping. The groupings are shown ranked in order of total effective cost.

TABLE 5

| Groupings | Effective Cost |
|---|---|
| Local: A; Regional: A; LD: H; CC: J first grouping created | $66.6 |
| Local: A; Regional: A; LD: I; CC: I fifth grouping created | $69.9 |
| Local: B; Regional: B; LD: H; CC: J fourth grouping created | $71.3 |
| Local: C; Regional: G; LD: G; CC: G second grouping created | $72.9 |
| Local: F; Regional: G; LD: G; CC: G | $77.6 |
| Local: E; Regional: E; LD: E; CC: E third grouping created | $78.6 |
| Local: D; Regional: D; LD: D; CC: D | $82.4 |

The first available grouping listed in Table 5 is local service and regional toll service by service provider A, service provider H as the long distance option and J as calling card service provider. This grouping was created by first selecting A as the option for local service at step 1110, because A is the highest ranked option for the first category, local phone service. A's local phone service is linked to A's regional toll service, therefore A is also selected as the regional toll service for this grouping at step 1120, even though A is not the highest ranked plan in this category.

Local service A is not linked to any options in the long distance or calling card categories, therefore this grouping still requires options for the long distance and calling card categories. At step 1127, the highest ranked option for the next available category is determined. In this example, long distance is the next category and E is the highest ranked option for long distance. However, E long distance service is linked to E local and regional toll service, therefore it is not available as an option for this grouping, as local and regional toll service options in the grouping have already been filled. Therefore, as shown by steps 1135-1140-1141, and the next highest ranked option in the long distance category is determined, in this case H. H is not linked to any other plans, therefore this grouping is valid, and H is selected at step 1149.

The process loops back to step 1125. At this point, the local, regional toll and long distance categories of this grouping have selected options; however, the calling card category still has no option selected, so the process is repeated.

At step 1127, the highest ranked calling card plan is J. J is not linked to any other plans at step 1135, and therefore J is selected at step 1149 and the process loops back to step 1125. At this point, every category in the current grouping has an option selected, and therefore the process continues to step 1150. The total effective cost for this grouping is determined by adding the effective costs of each of the selected options. The options for this grouping and the total effective cost are saved at step 1160. As shown in Table 5, the total effective cost for this grouping is $66.6.

As shown by steps 1170-1180, the process continues by stepping to the next category, in this example, regional toll service. The highest ranked option for regional toll service, option G, is selected for the second grouping at step 1110. At step 1115, it is determined that G also has long distance and calling card plans, therefore these options are selected for this grouping at step 1120.

However, this second grouping does not have a selected option for local service at this point, so the process continues step 1127. A is the highest ranked local phone service. However, a local service is linked to A regional toll service, therefore as shown by steps 1135-1140, local service option A cannot be selected as the local telephone service for this grouping.

Therefore, as shown by step 1141, the next highest ranked option is determined and evaluated. The next highest ranked local service plan is B. However, like A, B is linked to regional toll service and cannot be selected for this grouping. The next highest ranked local service plan is C. C is not linked to any other options; therefore C is selected for this grouping as shown by steps 1135-1149.

The process continues to step 1125. After the selection of C, this grouping is complete, therefore the total effective cost for the combination of C local service and G regional toll service, long distance service and calling card plans is calculated at step 1150. As shown in Table 5, the effective cost of this grouping is $72.9.

The process then steps to the next category, long distance service plan. At step 1110, E is selected as the long distance service plan for the current grouping. At step 1115, it is determined that E has links in every category, and therefore E is selected for the local, regional toll and calling card categories at step 1120. As these selections make the grouping complete, no further categories need to be considered and the process continues to step 1150, where the total effective cost for this grouping is calculated. As shown in Table 5, the total effective cost of this grouping is $78.4.

The next category is calling card plans. The highest ranked calling card plan is through service provider J. J is selected for this grouping at step 1110, and since J is not linked to any options in other categories, the process continues to step 1125. At this point, this grouping only has J calling card service selected, therefore the process continues to step 1127.

The highest ranked local telephone service plan is A, however since A has already been selected as local telephone service in a previous grouping with J, the system considers the next highest ranked local telephone service option, in this case B. B has not been selected for any grouping yet. At step 1135, it is determined that B has a linked regional toll service plan, and since there is no selected option for regional toll service in this grouping, there is no conflict and B is selected as local and regional toll service for this grouping at step 1149. The process continues to step 1125, and since there is still no selection for long distance for this grouping, the process continues to step 1127.

The highest ranked long distance plan is E, however E has already been used in a previous grouping. The next highest ranked long distance plan is H. Although H has been used in another grouping, it has not been used in combination with B. Therefore, as H is not linked to any other options, H is selected as the long distance option for this grouping. The total effective cost of this grouping is $71.3, as is shown in Table 5.

At this point, groupings have been made using the highest ranked options in each commodity category of the combination. As shown by step 1170, the process for creating groupings can be repeated for any number of rows. In the preferred embodiment, additional groupings are created using the second highest ranked options for each category using the same process as described above.

The second highest rated option for local telephone service is B. However, B local telephone service has already been included in the previously created fourth grouping that was created when evaluating the highest ranked options. Therefore, no new groupings are created at this time. The second highest rated option for regional toll service is A. However, A regional toll service was included as part of the first grouping created by evaluating the highest ranked options. The second highest rated option for long distance is H. Long distance H was also included in the first grouping. The second highest rated option for calling card service is G. However, G calling card service was included as part of the second grouping created by evaluating the highest ranked options. Therefore in this example no new groupings are created by considering the second highest ranked options of each category.

If the third highest ranked options in each category are considered, one new grouping is created. Third ranked option I for long distance service has not been included in any grouping thus far. Therefore, after selecting I as long distance at step 1110, I is selected as the linked calling card plan at steps 1115-1120. As this current grouping does not have options selected for local and regional toll service, it is determined at step 1127 that highest ranked local service option A has not previously been used in a grouping with I. At step 1135, it is determined that local service A is linked to regional toll service A. Since this grouping does not have an option for regional toll service, there is no conflict with the selection of A as local and regional toll service for this grouping at step 1140, and therefore local service option A and regional toll service option A are selected for this grouping at step 1149.

Continuing to step 1125, this grouping is now complete, and therefore the total effective cost for this grouping is calculated and saved with the grouping.

If the fourth, fifth and sixth ranked options in each category are considered, two additional groupings are created. These are also shown in Table 5.

In addition to the groupings that are created by the system, the customer may also be given the option of creating a custom combination by selecting individual plans and/or bundles, so long as none of the options selected violate any bundling links. Preferably, the system calculates a total effective cost of custom customer-created combinations so that these custom combinations may be compared to the groupings created by the system.

Table 5 shows the combination options that were created by following the above process for the top six rated category options. These groupings are shown in order of total effective cost. This is the preferable method of displaying the available groupings to the customer to reflect best value.

Although the present invention was described with an example of an ISP plan commodity category and an example of a telephone services combination, the present invention is not limited for use with ISP plans or bundles of telephone service plans. A person skilled in the art will know how to modify the present invention for use with other products and/or services.

While the invention has been described in detail and with reference to specific embodiments thereof, it will be apparent to one skilled in the art that various changes and modifications can be made therein without departing from the spirit or scope thereof. Thus, it is intended that the present invention covers the modifications and variations of this invention provided they come within the scope of the appended claims and their equivalents.

What is claimed is:

1. A computer-implemented method for assisting a customer in choosing a combination of commodities, wherein a combination is composed of one commodity selected from each of N categories, and wherein N is an integer greater than one, the method comprising:
    (a) ranking the commodities within each category based, in part, on at least one optimization parameter;
    (b) creating a first combination for a first category by:
        (i) selecting a highest ranked commodity from the first category;
        (ii) automatically selecting any commodities in other categories that are linked to the commodity selected in step(b)(i);
        (iii) selecting a valid commodity for each of the categories from which a commodity has not already been selected for the first combination;
    (c) repeating (b) for the other N−1 categories to create N−1 other combinations;
    (d) calculating a total cost of each combination; and
    (e) presenting the combinations to the customer, wherein steps (a) through (e), inclusive, are executed on a computer device.

2. The method of claim 1, further comprising:
    for the first category, using the computer device creating another combination by:
        (iv) selecting a next ranked commodity from the first category;
        (v) automatically selecting any commodities in other categories that are linked to the commodity selected in step (iv); and
        (vi) selecting a valid commodity for each of the categories from which a commodity has not been selected for the another combination.

3. The method of claim 2, wherein (iv), (v) and (vi) are repeated for a plurality of ranks.

4. The method of claim 1, wherein (e) comprises presenting the combinations of commodity options ranked by the total cost.

5. The method of claim 1, wherein (a) comprises calculating an effective cost for each commodity and ranking the options within each category by effective cost.

6. The method of claim 5, wherein the effective cost calculations include bundling discounts.

7. The method of claim 5, wherein (d) comprises calculating a total effective cost for each of the combinations by adding the effective costs of the selected commodities in a combination.

8. The method of claim 5, wherein (a) comprises, for each category:
    (i) identifying at least one first parameter associated with a commodity;
    (ii) associating at least one value to the at least one first parameter;
    (iii) calculating an estimated cost of the commodity based on features of the category that are desired by the customer;
    (iv) obtaining from the customer a preference weighting on at least one second parameter;
    (v) calculating an effective cost of the commodity by adjusting the estimated cost based on the preference weighting and the at least one value assigned to the parameters; and
    (vi) ranking the commodities within each category by effective cost.

9. The method of claim 8, wherein the parameter is a feature, an attribute, or a performance characteristic associated with a category.

10. The method of claim 8, wherein (a)(ii) includes the steps of:
    setting a range for the at least one first parameter;
    sampling a random set of customers over the range; and
    determining a best fit utility function using regression analysis on data received as a result of sampling.

11. The method of claim 10, wherein the utility function is evaluated to obtain the at least one value, wherein the value represents a cost or benefit of the parameter to the customer.

12. The method of claim 10, wherein the regression analysis employs at least one constant to determine the utility function.

13. The method of claim 1, wherein (e) comprises presenting the combinations to the customer, whereby the customer selects a portion of a combination of commodities for purchase.

14. A computer-readable medium encoded with a plurality of instructions for controlling a computing system to perform an operation for assisting a customer in choosing a combination of commodities, wherein a combination is composed of one commodity selected from each of N categories, and wherein N is an integer greater than one, the operation comprising:
    (a) ranking the commodities within each category based, in part, on at least one optimization parameter;
    (b) creating a first combination for a first category by:
        (i) selecting a highest ranked commodity from the first category;

(ii) automatically selecting any commodities in other categories that are linked to the commodity selected in step(b)(i);

(iii) selecting a valid commodity for each of the categories from which a commodity has not already been selected for the first combination;

(c) repeating (b) for the other N–1 categories to create N–1 other combinations;

(d) calculating a total cost of each combination; and (e) presenting the combinations to the customer.

15. The computer-readable medium of claim 14, wherein the operation further comprises:

for the first category, creating another combination by:

(iv) selecting a next ranked commodity from the first category;

(v) automatically selecting any commodities in other categories that are linked to the commodity selected in step (iv); and (vi) selecting a valid commodity for each of the categories from which a commodity has not been selected for the another combination.

16. The computer-readable medium of claim 14, wherein (a) comprises calculating an effective cost for each commodity and ranking the options within each category by effective cost.

17. The computer-readable medium of claim 16, wherein (d) comprises calculating a total effective cost for each of the combinations by adding the effective costs of the selected commodities in a combination.

18. The computer-readable medium of claim 14, wherein (a) comprises, for each category:

(i) identifying at least one first parameter associated with a commodity;

(ii) associating at least one value to the at least one first parameter;

(iii) calculating an estimated cost of the commodity based on features of the category that are desired by the customer;

(iv) obtaining from the customer a preference weighting on at least one second parameter;

(v) calculating an effective cost of the commodity by adjusting the estimated cost based on the preference weighting and the at least one value assigned to the parameters; and (vi) ranking the commodities within each category by effective cost.

19. The computer-readable medium of claim 18, wherein the associating at least one value includes:

setting a range for the at least one first parameter;

sampling a random set of customers over the range; and determining a best fit utility function using regression analysis on data received as a result of sampling.

20. The computer-readable medium of claim 19, wherein (e) comprises providing to the customer means to select a portion of a combination of commodity options for purchase.

\* \* \* \* \*

UNITED STATES PATENT AND TRADEMARK OFFICE
CERTIFICATE OF CORRECTION

PATENT NO. : 7,707,090 B2
APPLICATION NO. : 12/195752
DATED : April 27, 2010
INVENTOR(S) : Scott Andrew Snyder It is certified that error appears in the above-identified patent and that said Letters Patent is hereby corrected as shown below:

On page 1, in column 2, after "(74) Attorney, Agent, or Firm", approximately line 24, delete "Darby & Darby P.C." and insert -- Frommer Lawrence & Haug LLP --, therefor.

On the Title page, on page 2, Item (56) under "Other Publications", line 35, delete "'em" and insert -- 'me --, therefor.

On the Title page, on page 2, Item (56) under "Other Publications", line 36, delete "Doialog" and insert -- Dialog --, therefor.

In column 20, line 60, in claim 14, delete "ofN" and insert -- of N --, therefor.

Signed and Sealed this

Twenty-third Day of November, 2010

David J. Kappos
*Director of the United States Patent and Trademark Office*